(12) United States Patent
Kim et al.

(10) Patent No.: US 11,340,650 B2
(45) Date of Patent: May 24, 2022

(54) DISPLAY APPARATUS

(71) Applicant: SAMSUNG ELECTRONICS CO., LTD., Suwon-si (KR)

(72) Inventors: Sun-Jin Kim, Suwon-si (KR); Kyoungyoon Lee, Suwon-si (KR); Heongseog Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/875,052

(22) Filed: May 15, 2020

(65) Prior Publication Data

US 2021/0011511 A1   Jan. 14, 2021

(30) Foreign Application Priority Data

Jul. 8, 2019 (KR) .................. 10-2019-0081973

(51) Int. Cl.
*G06F 1/16* (2006.01)
*G02F 1/1333* (2006.01)
(Continued)

(52) U.S. Cl.
CPC ...... *G06F 1/1609* (2013.01); *G02F 1/133608* (2013.01); *G06F 1/203* (2013.01);
(Continued)

(58) Field of Classification Search
CPC ............ G06F 1/1609; G02F 1/133605; G02F 1/133308; G02F 1/133602; G02F 1/133603; G02F 1/133608
See application file for complete search history.

(56) References Cited

U.S. PATENT DOCUMENTS 9,651,205 B2    5/2017   Yamamoto et al.
2012/0092568 A1  4/2012   Yokota
(Continued)

FOREIGN PATENT DOCUMENTS

KR   10-2008-0045402   5/2008
KR   10-2016-0051569   5/2016
(Continued)

OTHER PUBLICATIONS

International Search Report dated Oct. 27, 2020 from International Application No. PCT/KR2020/008529, 4 pages.
(Continued)

*Primary Examiner* — Nidhi Thaker
(74) *Attorney, Agent, or Firm* — Staas & Halsey LLP

(57) ABSTRACT

A display apparatus with improved assembility, productivity and quality. The display apparatus includes: a display panel; a rear chassis covering a rear surface of the display panel, and the rear chassis including a coupling protrusion protruding toward the display panel; a reflective sheet including a fixing hole in which the coupling protrusion is inserted, and rested on a front surface of the rear chassis when the coupling protrusion is inserted in the fixing hole; and a substrate coupled to the rear chassis in a front direction of the reflective sheet such that the reflective sheet is prevented from being separated from the rear chassis, wherein a plurality of light sources configured to irradiate light toward the display panel are mounted on the substrate.

18 Claims, 12 Drawing Sheets

(51) Int. Cl.
*G06F 1/20* (2006.01)
*G02F 1/13357* (2006.01)
(52) U.S. Cl.
CPC .. *G02F 1/133308* (2013.01); *G02F 1/133603* (2013.01); *G02F 1/133605* (2013.01)

(56) References Cited

U.S. PATENT DOCUMENTS

| | | | |
|---|---|---|---|
| 2014/0153284 A1* | 6/2014 | Hong | G02F 1/1336 362/97.1 |
| 2016/0011461 A1 | 1/2016 | Kim | |
| 2016/0223866 A1* | 8/2016 | Lee | G02F 1/133608 |
| 2016/0259207 A1* | 9/2016 | Matsuo | G02F 1/133603 |
| 2017/0076658 A1 | 3/2017 | Yeo et al. | |
| 2017/0323601 A1* | 11/2017 | Baek | G02F 1/133603 |
| 2021/0165158 A1* | 6/2021 | Kim | G02F 1/133317 |

FOREIGN PATENT DOCUMENTS

| | | |
|---|---|---|
| KR | 10-2016-0083175 | 7/2016 |
| KR | 10-1694150 | 1/2017 |
| WO | 2013/021933 | 2/2013 |
| WO | WO-2013021933 A1 * | 2/2013 ....... G02F 1/133603 |

OTHER PUBLICATIONS

Extended European Search Report dated Aug. 5, 2020 from European Application No. 20177585.5, 40.
European Office Action dated Jan. 7, 2022 from European Application No. 20177585.5.

* cited by examiner

DISPLAY APPARATUS

CROSS-REFERENCE TO RELATED APPLICATIONS

This application is based on and claims priority under 35 U.S.C. § 119 to Korean Patent Application No. 10-2019-0081973, filed on Jul. 8, 2019 in the Korean Intellectual Property Office, the disclosure of which is incorporated by reference herein in its entirety.

BACKGROUND

1. Field

The disclosure relates to a display apparatus with improved assembly, productivity and quality.

2. Description of the Related Art

A display apparatus is an output apparatus for visually displaying images and data information, such as characters, figures, etc.

The display apparatus includes a self-emissive display panel such as an Organic Light-Emitting Diode (OLED) panel, or a light-receiving display panel such as a Liquid Crystal Display (LCD) panel.

A LCD apparatus may include a display panel on which images are displayed, and a backlight unit for supplying light to the display panel. Also, the LCD apparatus may include a reflective sheet for reflecting light irradiated from the backlight unit to improve the brightness of the display panel.

Typically, a backlight unit is coupled to a rear chassis, and then, a reflective sheet is coupled to the front side of the backlight unit. Because the backlight unit includes a substrate on which light sources are mounted and lenses covering the light sources to diffuse light, the reflective sheet includes lens holes through which the lenses pass. In this case, foreign materials such as dust may enter the inside of the display apparatus through the lens holes that are larger than the lenses. When foreign materials enter the inside of the display apparatus, the quality of the display apparatus may deteriorate.

Also, to prevent the reflective sheet from being lifted around the lens holes, a roller process for resting the reflective sheet between the lenses and the substrate is required. However, due to the roller process, the assembly and productivity of the display apparatus may also deteriorate.

SUMMARY

Additional aspects and/or advantages will be set forth in part in the description which follows and, in part, will be apparent from the description, or may be learned by practice of the presented embodiments.

Therefore, it is an aspect of the disclosure to provide a display apparatus with improved assembly, productivity and quality.

It is another aspect of the disclosure to provide a display apparatus with an improved structure to prevent foreign materials from entering the inside of the display apparatus.

It is another aspect of the disclosure to provide a display apparatus with an improved structure to improve assembly and productivity.

It is another aspect of the disclosure to provide a display apparatus with improved heat dissipation performance.

It is another aspect of the disclosure to provide a display apparatus with an improved structure to reduce noise that is generated when a substrate on which light sources are mounted bumps into a rear chassis.

It is another aspect of the disclosure to provide a display apparatus with improved assembly and productivity by reducing processes required for fixing a reflective sheet to a rear chassis.

Additional aspects of the disclosure will be set forth in part in the description which follows and, in part, will be obvious from the description, or may be learned by practice of the disclosure.

In accordance with an aspect of the disclosure, a display apparatus includes: a display panel; a rear chassis covering a rear surface of the display panel, and including a coupling protrusion protruding toward the display panel; a reflective sheet including a fixing hole in which the coupling protrusion is inserted, and rested on a front surface of the rear chassis when the coupling protrusion is inserted in the fixing hole; and a substrate coupled to the rear chassis in a front direction of the reflective sheet such that the reflective sheet is prevented from being separated from the rear chassis, wherein a plurality of light sources configured to irradiate light toward the display panel are mounted on the substrate.

The substrate may include a coupling hole in which the coupling protrusion passed through the fixing hole is inserted.

The coupling hole may include: a first coupling area having a width that is larger than an external diameter of the coupling protrusion such that the coupling protrusion is able to be inserted in the first coupling area; and a second coupling area extending in a direction in which the substrate extends from the first coupling area, the second coupling area having a width that is smaller than the external diameter of the coupling protrusion.

After the coupling protrusion passes through the fixing hole to be inserted in the first coupling area, the coupling protrusion may slide in a direction in which the substrate extends to be fixed to the second coupling area.

The coupling protrusion may include a coupling groove depressed along at least one portion of a circumference of the coupling protrusion such that the coupling protrusion slides from the first coupling area and is inserted in the second coupling area.

The reflective sheet may further include a plurality of heat dissipation holes respectively corresponding to the plurality of light sources.

The rear chassis may further include a heat dissipation groove formed by depressing a portion of the rear chassis corresponding to each of the heat dissipation holes toward the substrate.

The heat dissipation groove may pass through the heat dissipation hole to contact a rear surface of the substrate, thereby transferring heat generated from the substrate to the rear chassis.

The substrate may cover the heat dissipation hole in the front direction of the reflective sheet to prevent dust from entering in the front direction of the reflective sheet through the heat dissipation hole.

A front surface of the substrate may be coated with a high reflection coating material to reduce a difference in reflectance between the reflective sheet and the front surface of the substrate.

The rear chassis may further include a recessed portion that is recessed toward a rear direction of the rear chassis.

The coupling protrusion may protrude toward a front direction of the rear chassis from the recessed portion.

The display apparatus may further include a side frame coupled to the rear chassis along edges of the rear chassis.

When the side frame is coupled to the rear chassis, edges of the reflective sheet may be inserted and fixed between the rear chassis and the side frame.

The side frame may include a resting groove on which the edges of the reflective sheet are rested.

A diameter of the fixing hole may correspond to an external diameter of the coupling protrusion to prevent dust from entering in the front direction of the reflective sheet through the fixing hole.

The substrate may be coupled to the rear chassis such that the plurality of light sources face the display panel.

In accordance with another aspect of the disclosure, a display apparatus includes: a display panel; a substrate on which a plurality of light sources configured to irradiate light to the display panel are mounted, the substrate comprising a coupling hole; a rear chassis covering a rear surface of the display panel, the rear chassis comprising a coupling protrusion sliding in the coupling hole to be coupled to the coupling hole; and a reflective sheet positioned between the substrate and the rear chassis and comprising a fixing hole in which the coupling protrusion is inserted.

The coupling hole may include: a first coupling area having a width that is larger than an external diameter of the coupling protrusion such that the coupling protrusion is able to be inserted in the first coupling area; and a second coupling area extending in a direction in which the substrate extends from the first coupling area, the second coupling area having a width that is smaller than the external diameter of the coupling protrusion.

The reflective sheet may further include a plurality of heat dissipation holes respectively corresponding to the plurality of light sources.

The rear chassis may further include a heat dissipation groove formed by depressing a portion of the rear chassis corresponding to each of the heat dissipation holes toward the substrate.

The heat dissipation groove may pass through the heat dissipation hole to contact a rear surface of the substrate, thereby transferring heat generated from the substrate to the rear chassis.

In accordance with another aspect of the disclosure, a display apparatus includes: a display panel; a substrate on which a plurality of light sources configured to irradiate light to the display panel are mounted, wherein the substrate is positioned behind the display panel in such a way to face the display panel and includes a coupling hole; a reflective sheet positioned behind the substrate and including a fixing hole formed at a location corresponding to the coupling hole; and a rear chassis to which the substrate and the reflective sheet are coupled, the rear chassis including a coupling protrusion passing through the fixing hole to be inserted in the coupling hole.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

The terms used in the present specification are merely used to describe particular embodiments, and are not intended to limit the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms "first," "second," etc. may be used herein to describe various components, these components should not be limited by these terms. These terms are only used to distinguish one component from another. For example, a first component could be termed a second component, and, similarly, a second component could be termed a first component, without departing from the scope of the disclosure.

Meanwhile, in the following description, the terms "front end", "rear end", "upper portion", "lower portion", "upper end", "lower end", etc. are defined based on the drawings, and the shapes and positions of the components are not limited by the terms.

Throughout the disclosure, the expression "at least one of a, b or c" indicates only a, only b, only c, both a and b, both a and c, both b and c, all of a, b, and c, or variations thereof.

A display apparatus is an apparatus for displaying a screen. Examples of the display apparatus include a monitor and a television. Hereinafter, an example of the display apparatus is assumed to be a television. The television may include a flat television, a curved television, a bendable television, etc., and hereinafter, an example of the television is assumed to be a flat television.

Figure 1:
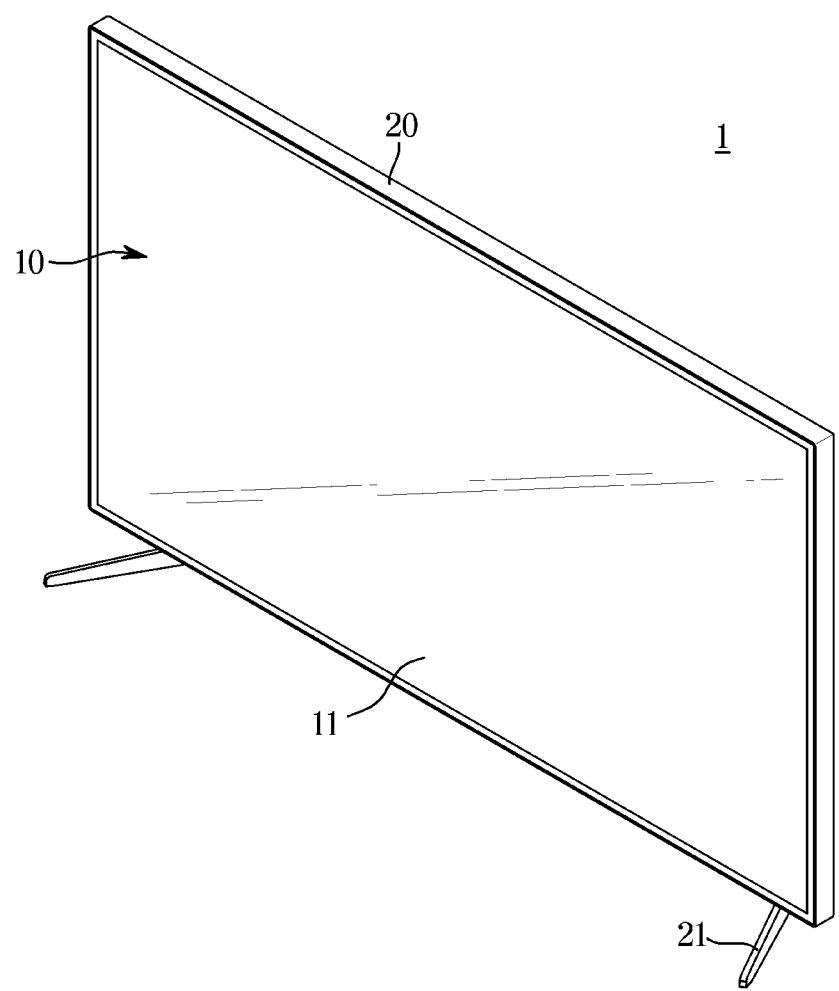
FIG. 1 is a perspective view schematically showing a display apparatus according to an embodiment of the disclosure.
Figure 2:
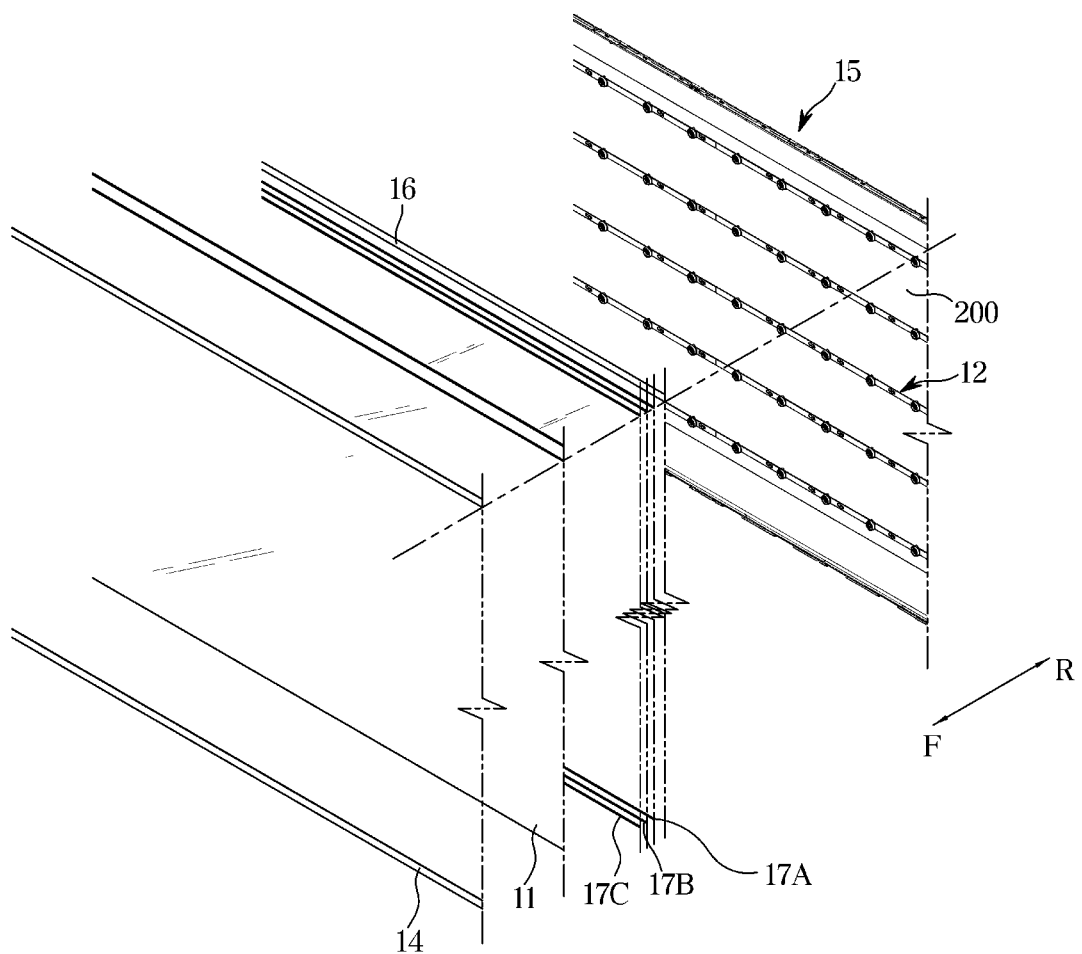
FIG. 2 is an exploded perspective view of a display module applied to a display apparatus according to an embodiment of the disclosure.

FIG. 1 is a perspective view schematically showing a display apparatus according to an embodiment of the disclosure, and FIG. 2 is an exploded perspective view of a display module applied to a display apparatus according to an embodiment of the disclosure.

Referring to FIG. 1, a display apparatus 1 may include a display module 10 for displaying a screen, and a support 20 coupled to a rear side of the display module 10 to support the display module 10.

As shown in FIGS. 1 and 2, the display apparatus 1 may include the display module 10 for displaying images. The display module 10 may have at least one of a flat shape or a curved shape according to a type of the display apparatus 1. That is, when the display apparatus 1 is a flat television as shown in FIG. 1, the display module 1 may have a flat shape. When the display apparatus 1 is a curved television, the display module 10 may have a curved shape. When the display apparatus 1 is a bendable television, the shape of the display module 10 may change between a flat shape and a curved shape.

The display apparatus 1 may further include a case 20 for accommodating the display module 10 and various electronic components.

The case 20 may surround the display module 10 from behind the display module 10. The case 20 may include a stand 21 for making the display apparatus 1 stand.

Also, although not shown in the drawings, the display apparatus 1 may be fixed to a wall through a wall-mounting bracket mounted on the wall, instead of including the stand 21. The wall-mounting bracket may be separable from the case 20.

In the inside of the case 20, a power supply board (not shown) for supplying power to the display apparatus 1, a signal processing board (not shown) for processing various images and sound signals, a timing control board (not shown) for transferring image signals to a display panel 11, etc. may be positioned.

As shown in FIG. 2, the display module 10 may include the display panel 11 which may be a liquid crystal panel.

The display module 10 may further include a backlight unit 12 positioned behind the display panel 11 and configured to supply light to the display panel 11. The backlight unit 12 may include a plurality of substrates 100 and a plurality of light sources 110.

The plurality of substrates 100 may be coupled to a rear chassis 15. The plurality of substrates 100 may be separatably coupled to the rear chassis 15. The plurality of substrates 100 may be slidingly coupled to the rear chassis 15. The plurality of substrates 100 may be coupled to the rear chassis 15 such that the plurality of light sources 110 face the display panel 11. The plurality of substrates 100 may be formed in the shape of a bar extending in a longitudinal direction of the rear chassis 15, and be spaced in a up-down direction on the rear chassis 15.

The plurality of light sources 110 may be mounted on the plurality of substrates 100 to apply light to the display panel 11. The plurality of light sources 110 may be spaced from each other along a longitudinal direction of the plurality of substrates 100. The plurality of light sources 110 may be a plurality of light emitting diodes (LEDs) for generating light. The plurality of substrates 100 will be described in detail, later.

The display module 10 may further include a font chassis 14 covering edges of the display panel 11 and coupled to the rear chassis 15 in a front direction F.

The rear chassis 15 may cover the display panel 11 in a rear direction R. The backlight unit 12 and a reflective sheet 200 may be coupled to the rear chassis 15. The rear chassis 15 will be described in detail, later.

The display module 10 may further include a diffuser sheet 16. The diffuser sheet 16 may be formed in the shape of a flat sheet. The diffuser sheet 16 may be positioned between the display panel 11 and the backlight unit 12 to diffuse light supplied from the backlight unit 12.

A re-diffuser sheet 17A, a prism sheet 17B, and a protective sheet 17C, may be positioned in front of the diffuser sheet 16.

The re-diffuser sheet 17A may be opposite to the diffuser sheet 16 to re-diffuse light passed through the diffuser sheet 16. The prism sheet 17B may be positioned in front of the re-diffuser sheet 17A such that light re-diffused by the re-diffuser sheet 17A is concentrated in a direction that is perpendicular to the display panel 11. The prism sheet 17B may include a pattern in the shape of a prism. The protective sheet 170 may be positioned in front of the prism sheet 17B to protect the prism sheet 17B.

However, the inside structure of the display module 10 as described above may be an example, and an arrangement of the above-described sheets may change.

Figure 3:
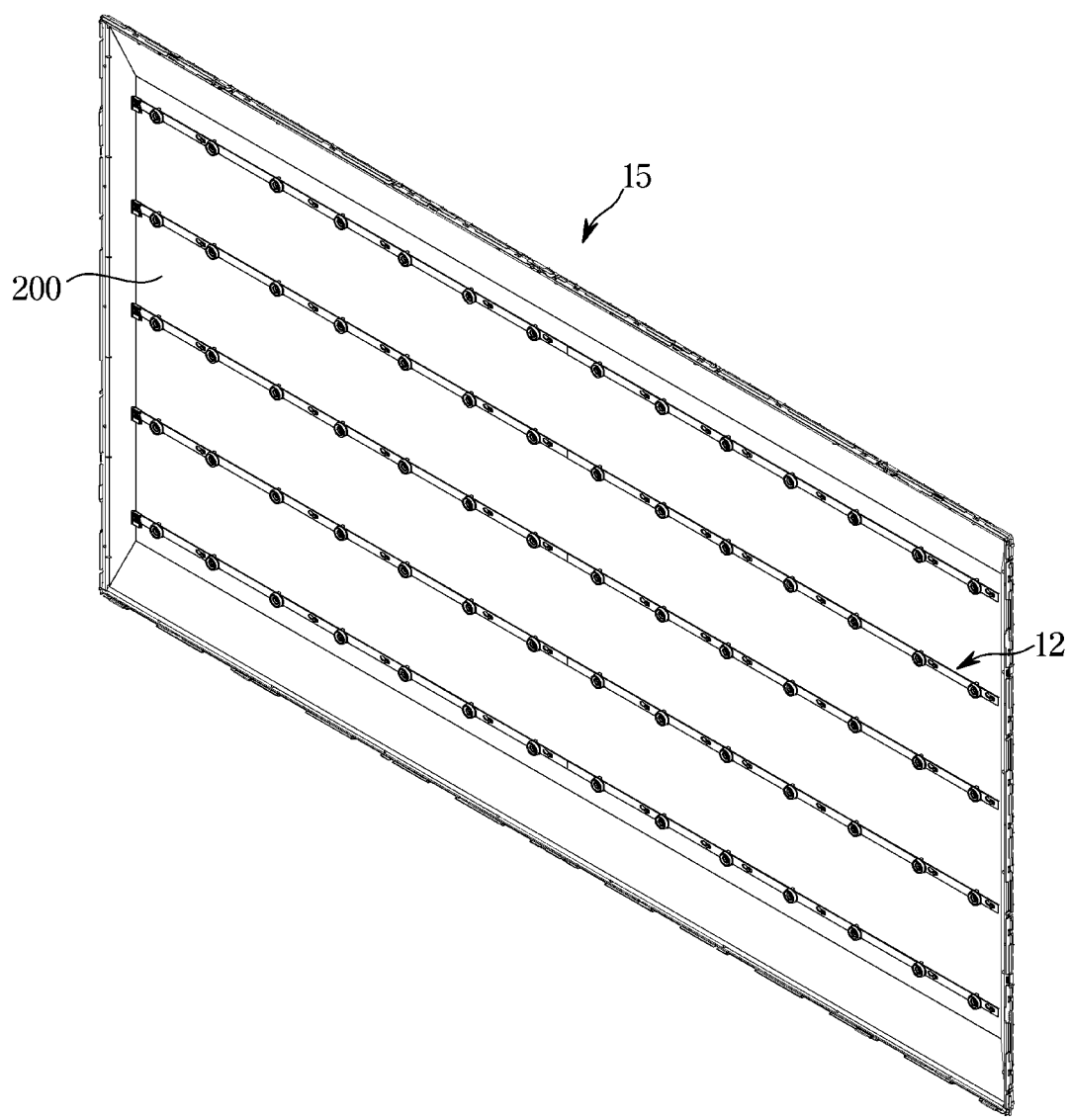
FIG. 3 shows a rear chassis to which a backlight unit and a reflective sheet are coupled, in a display apparatus according to an embodiment of the disclosure.
Figure 4:
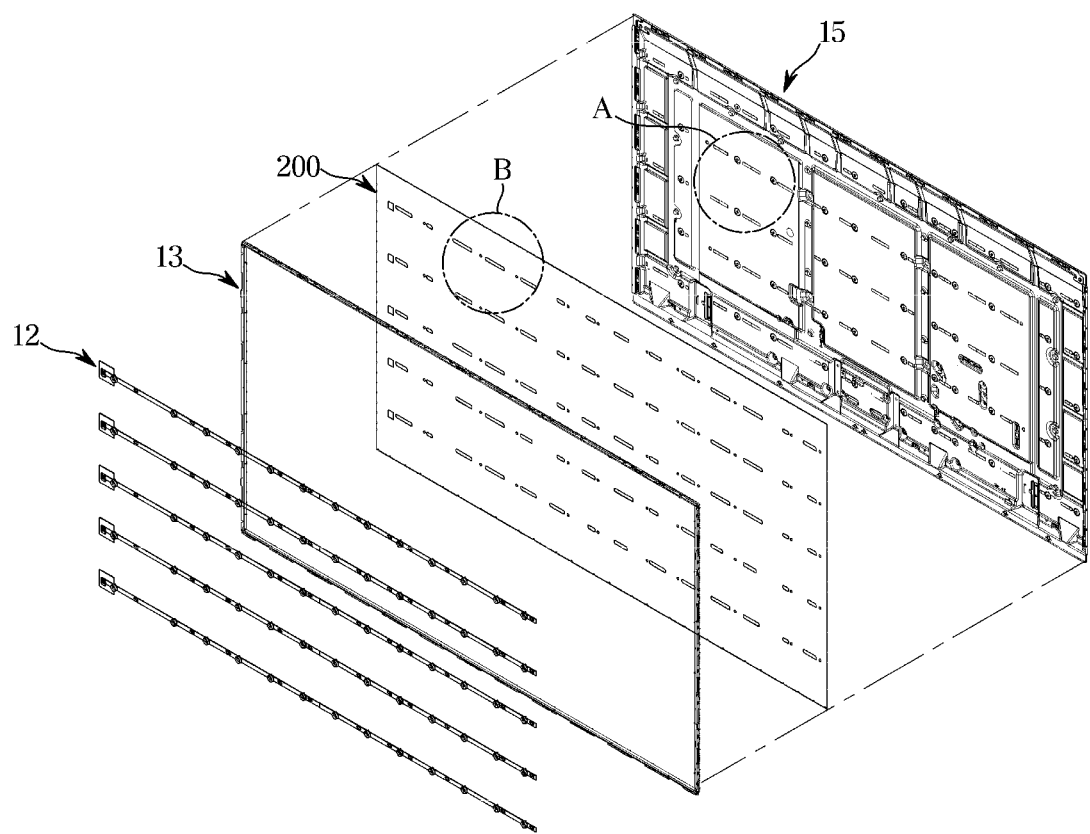
FIG. 4 is an exploded perspective view of the rear chassis shown in FIG. 3.

FIG. 3 shows a rear chassis to which a backlight unit and a reflective sheet are coupled, in a display apparatus according to an embodiment of the disclosure. FIG. 4 is an exploded perspective view of the rear chassis shown in FIG. 3.

Referring to FIG. 3, the reflective sheet 200 and the backlight unit 12 may be coupled to the rear chassis 15. According to a concept of the disclosure, after the reflective sheet 200 is coupled to the rear chassis 15, the backlight unit 12 may be coupled to a front side of the reflective sheet 200. Typically, after a backlight unit is coupled to a rear chassis, a reflective sheet has been coupled to a front side of the backlight unit. However, according to a concept of the disclosure, the backlight unit 12 may be positioned in front of the reflective sheet 200. A technical effect due to the position will be described later.

Referring to FIG. 4, the reflective sheet 200 may be positioned on the front side of the rear chassis 15, and the backlight unit 12 may be positioned on the front side of the reflective sheet 200. In other words, after the reflective sheet 200 is coupled to the front side of the rear chassis 15, the backlight unit 12 may be coupled to the rear chassis 15 in the front direction of the reflective sheet 20.

A side frame 13 may be coupled to the rear chassis 15 along edges of the rear chassis 15. The side frame 13 may prevent edge portions of the reflective sheet 20 from being lifted. The side frame 13 will be described in detail, later.

Figure 5:
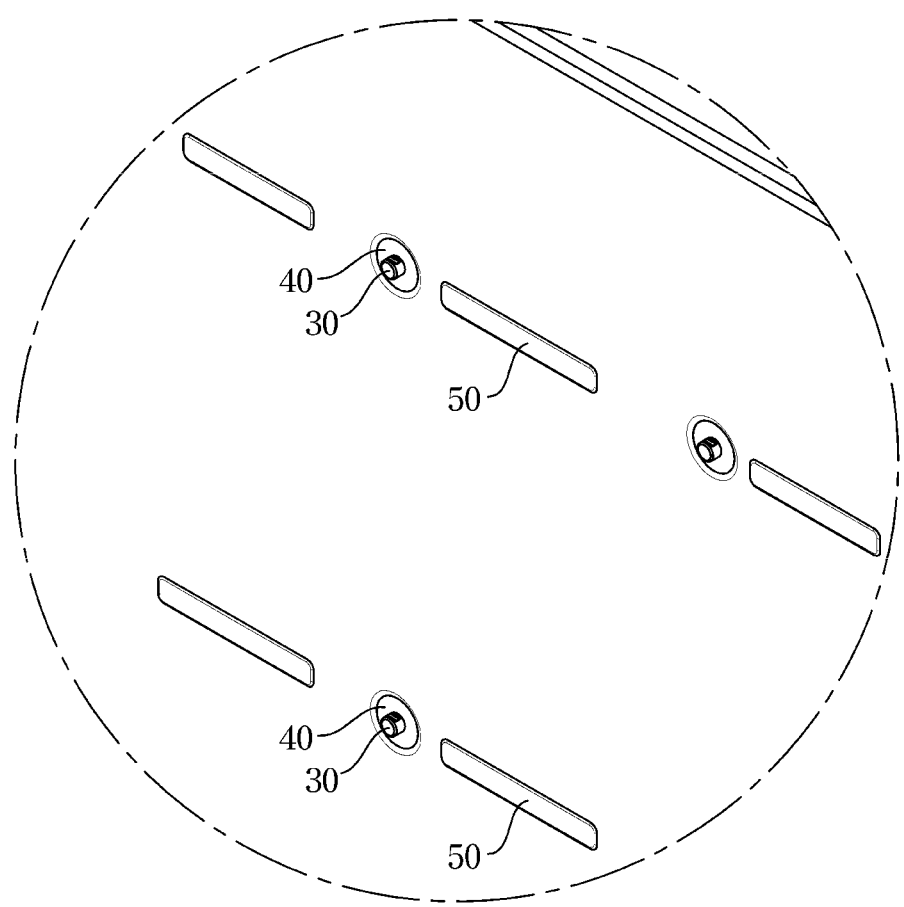
FIG. 5 is an enlarged view of an area A of FIG. 4.
Figure 6:
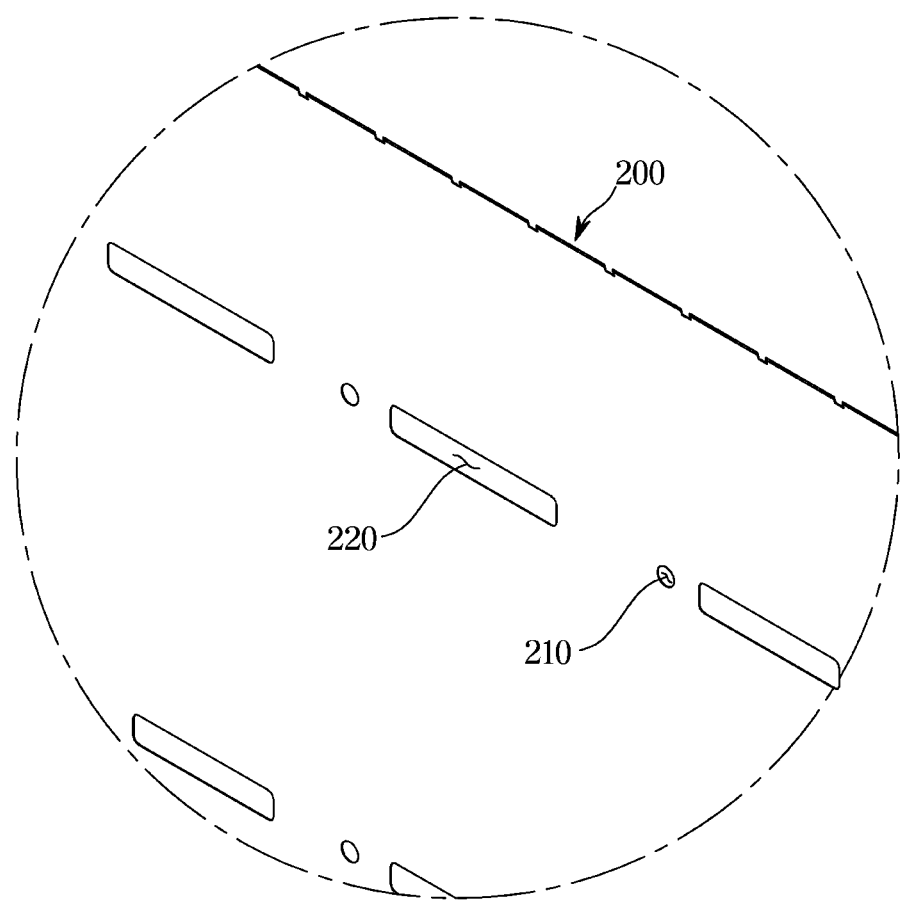
FIG. 6 is an enlarged view of an area B of FIG. 4.

FIG. 5 is an enlarged view of an area A of FIG. 4. FIG. 6 is an enlarged view of an area B of FIG. 4.

Referring to FIG. 5, the rear chassis 15 may include a coupling protrusion 30 protruding toward the display panel 11.

The coupling protrusion 30 may fix a position of the reflective sheet 200. The coupling protrusion 30 may be inserted in a fixing hole (will be described later) 210 of the reflective sheet 200. Also, the coupling protrusion 30 may be inserted in a coupling hole 101 (will be described later) of the substrates 100. A detailed description about the coupling protrusion 30 will be given later.

The rear chassis 15 may include a recessed portion 40. The recessed portion 40 may be formed by depressing a portion of the rear chassis 15 in the rear direction. The recessed portion 40 of the rear chassis 15 may be substantially in the shape of a circle. The coupling protrusion 30 may be positioned at a center of the recessed portion 40. The recessed portion 40 may be formed in the rear chassis 15 through embossing. The recessed portion 40 may reinforce stiffness of the rear chassis 15. More specifically, the recessed portion 40 may prevent the rear chassis 15 from being deformed when at least one coupling protrusion 30 is molded in the rear chassis 15. A length of the coupling protrusion 30 protruding toward the front direction of the rear chassis 15 may be longer than a depth of the recessed portion 40 depressed in the rear direction of the rear chassis 15.

The rear chassis 15 may include a heat dissipation groove 50. The heat dissipation groove 50 may be formed by depressing a portion of the rear chassis 15 in the front direction. In other words, the heat dissipation groove 50 may be formed by making a portion of the rear chassis 15 protrude in the front direction. When the rear chassis 15 is seen at the front, the heat dissipation groove 50 may protrude in the front direction of the rear chassis 15. When the rear chassis 15 is seen from the back, the heat dissipation groove 50 may be recessed in the front direction of the rear chassis 15. The recessed/protruding portion of the rear chassis 15 may be substantially in the shape of a rectangle.

The heat dissipation groove 50 may contact the substrates 100. The heat dissipation groove 50 may increase a contact area between the substrates 100 and the rear chassis 15. Because the heat dissipation groove 50 increases a contact area between the substrates 100 and the rear chassis 15, heat generated from the substrates 100 may be efficiently dissipated through the rear chassis 15. Thereby, heat dissipation performance of the display apparatus 1 may be improved.

According to an embodiment of the disclosure, the depth of the recessed portion 40 depressed in the rear direction of the rear chassis 15 may be deeper than a depth of the heat dissipation groove 50 depressed in the front direction of the rear chassis 15. A length in left-right direction of the heat dissipation groove 50 may be longer than a length in left-right direction of the recessed portion 40. A length in up-down direction of the heat dissipation groove 50 may be shorter than a length in up-down direction of the recessed portion 40.

In the rear chassis 15, the recessed portion 40 and the coupling protrusion 30 and the heat dissipation groove 50 may be alternately arranged in the left-right direction. In this case, the recessed portion 40 and the coupling protrusion 30 may be spaced from the heat dissipation groove 50.

Referring to FIG. 6, the reflective sheet 20 may include the fixing hole 210 in which the coupling protrusion 30 is inserted. The coupling protrusion 30 may be inserted in the fixing hole 210, and a diameter of the fixing hole 210 may correspond to an external diameter of the coupling protrusion 30. Because the diameter of the fixing hole 210 corresponds to the external diameter of the coupling protrusion 30, foreign materials such as dust may be prevented from entering a gap between the coupling protrusion 30 and the fixing hole 210 when the coupling protrusion 30 is inserted in the fixing hole 210.

The reflective sheet 200 may further include a heat dissipation hole 220 in which the heat dissipation groove 50 is inserted. As described above, the heat dissipation groove 50 may be formed by causing a portion of the rear chassis 15 to protrude in the front direction. The heat dissipation groove 50 protruding in the front direction of the rear chassis 15 may be inserted in the heat dissipation hole 220 formed in the reflective sheet 200. The heat dissipation hole 220 may have a size corresponding to that of the heat dissipation groove 50.

The substrates 100 may cover the heat dissipation hole 220. To prevent foreign materials such as dust from entering the inside of the display apparatus 1 through the heat dissipation hole 220, the substrates 100 may cover the heat dissipation hole 220 in the front direction of the reflective sheet 200. Also, because the heat dissipation groove 50 is inserted in the heat dissipation hole 220, foreign materials may be substantially prevented from entering through the heat dissipation hole 220.

The fixing hole 210 and the heat dissipation hole 220 may be arranged alternately along the left-right direction in which the substrates 100 extend, and the fixing hole 210 may be spaced from the heat dissipation hole 220. Also, the fixing hole 210 may be spaced from the heat dissipation hole 220 in the up-down direction. According to an embodiment of the disclosure, the substrates 100 may be arranged in five rows along the up-down direction, although not limited thereto. That is, an arrangement of the substrates 100 may change depending on a size, etc. of the display apparatus 1.

Figure 7:
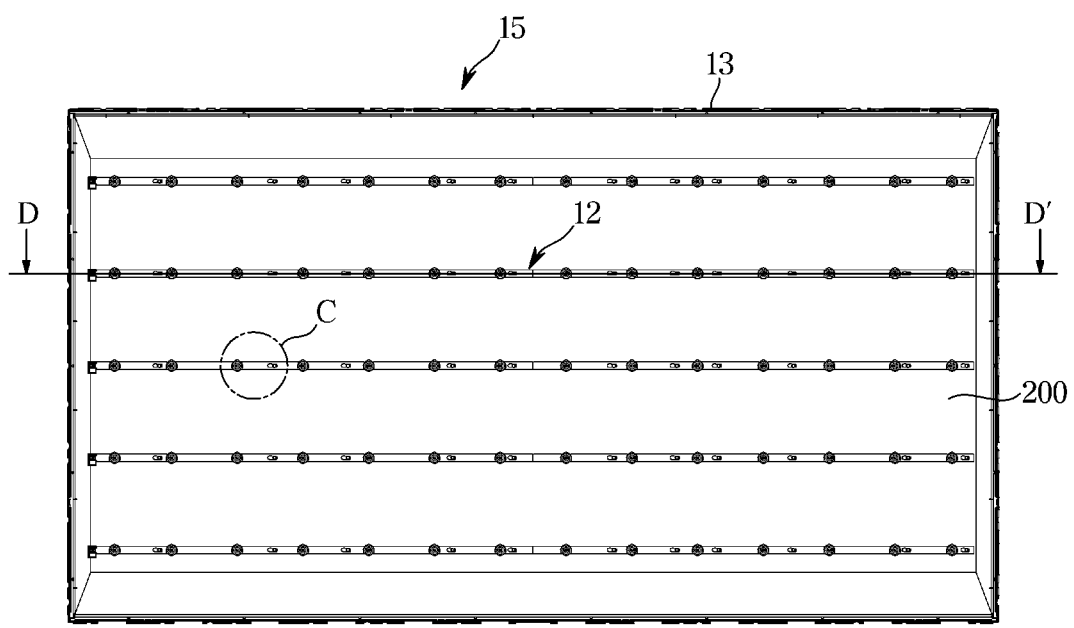
FIG. 7 is a front view of a rear chassis to which a backlight unit and a reflective sheet are coupled, in a display apparatus according to an embodiment of the disclosure.

FIG. 7 is a front view of a rear chassis to which a backlight unit and a reflective sheet are coupled, in a display apparatus according to an embodiment of the disclosure.

Referring to FIG. 7, in the display apparatus 1 according to an embodiment of the disclosure, the backlight unit 12 may be coupled to the rear chassis 15 to be positioned on the front side of the reflective sheet 200.

The backlight unit 12 may include the plurality of substrates 100 extending in the left-right direction as seen from the drawings, and the plurality of light sources 110 mounted on the plurality of substrates 100. The plurality of light sources 110 may be spaced from each other along a direction in which the substrates 100 extend.

The plurality of substrates 100 may be spaced along the up-down direction, and, according to an embodiment of the disclosure, the plurality of substrates 100 may be arranged in five rows in the up-down direction. As described above, the number of rows of the plurality of substrates 100 arranged in the up-down direction may change.

Also, the plurality of substrates 100 may be arranged such that two substrates are successively arranged in the left-right direction, although not limited thereto. That is, the plurality of substrates 100 may be arranged such that three or more substrates are successively arranged in the left-right direction or a substrate extends in the left-right direction.

Front surfaces of the plurality of substrates 100 may be coated with a high reflection coating material. This is aimed to reduce a difference in reflectance between the reflective sheet 200 and the substrates 100. Typically, a reflective sheet has been positioned on the front surfaces of substrates, and lens holes have been formed in the reflective sheet to penetrate the reflective sheet. On the substrates, LEDs as light sources and lenses covering the LEDs to diffuse light have been mounted. The lenses have passed through lens holes to be exposed in the front direction of the reflective sheet, and the reflective sheet has covered the entire front areas of the substrates except for the lens holes. Accordingly, a difference in reflectance between the front surfaces of the substrates and the reflective sheet is not important.

According to a concept of the disclosure, because the substrates 100 are positioned on the front side of the reflective sheet 200, the reflective sheet 200 may not cover the substrates 100. Accordingly, a difference in reflectance between the reflective sheet 200 and the front surfaces of the substrates 100 may be important. To reduce such a difference in reflectance, the front surfaces of the substrates 100 may be coated with a high reflection coating material, as described above.

Figure 8:
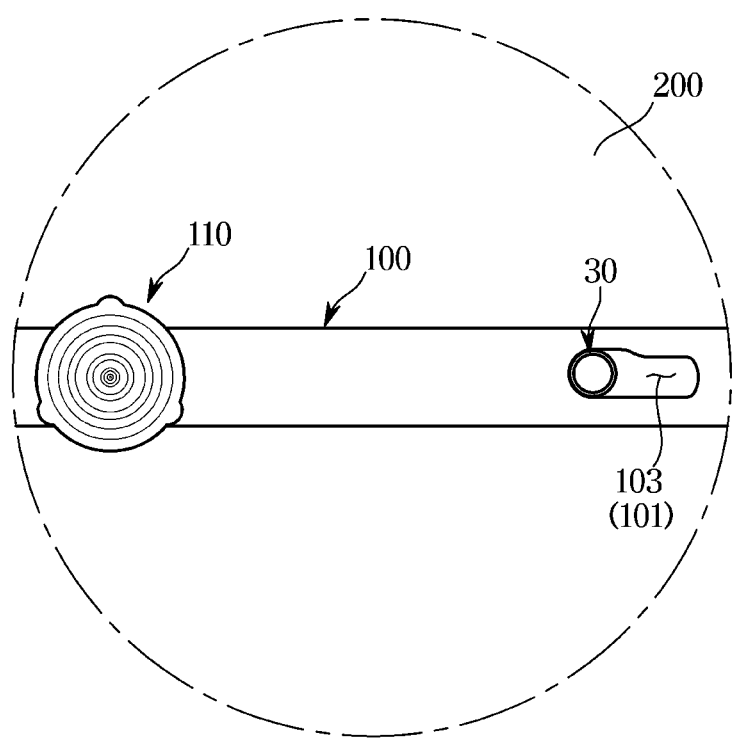
FIG. 8 is an enlarged view of an area C of FIG. 7, showing a state before the backlight unit is fixed to the rear chassis.

FIG. 8 is an enlarged view of an area C of FIG. 7, showing a state before the backlight unit is fixed to the rear chassis. AG. 9 is an enlarged view of the area C of FIG. 7, showing a state after the backlight unit is fixed to the rear chassis.

Figure 9:
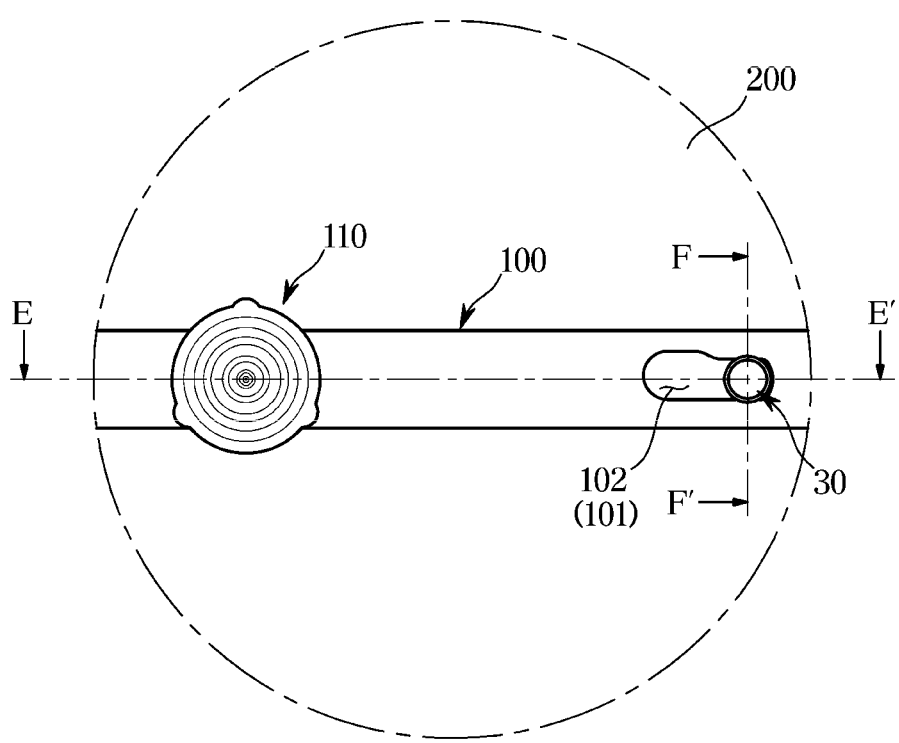
FIG. 9 is an enlarged view of the area C of FIG. 7, showing a state after the backlight unit is fixed to the rear chassis.

Referring to FIGS. 8 and 9, the backlight unit 12 may be slidingly coupled to the rear chassis 15.

Although not shown in the drawings, the reflective sheet 200 may be rested on the rear chassis 15. As described above, the coupling protrusion 30 protruding in the front direction may be provided on the rear chassis 15, and the fixing hole 210 may be provided in the reflective sheet 200 such that the coupling protrusion 30 is inserted in the fixing hole 210.

On the rear chassis 15, a plurality of coupling protrusions 30 may be provided, and in the reflective sheet 200, a plurality of fixing holes 210 may be provided to correspond to a number of the plurality of coupling protrusions 30.

By inserting the plurality of coupling protrusions 30 in the plurality of fixing holes 210, the reflective sheet 200 may be rested on the rear chassis 15. At this time, the reflective sheet 200 may be not completely fixed to the rear chassis 15. The reflective sheet 200 may be temporarily fixed not to move in the left-right direction on the rear chassis 15, and, when the backlight unit 12 is coupled to the rear chassis 15 and then the side frame 13 is coupled to the rear chassis 15, the reflective sheet 200 may be completely fixed to the rear chassis 15, which will be described later.

The diameter of the fixing hole 210 may correspond to the external diameter of the coupling protrusion 30. To prevent dust from entering the gap between the coupling protrusion 30 and the fixing hole 210 when the coupling protrusion 30 is inserted in the fixing hole 210, the external diameter of the coupling protrusion 30 may correspond to the diameter of the fixing hole 210.

In a typical display apparatus, lens holes having a larger diameter than the external diameter of lenses have been formed in a reflective sheet such that the lenses are inserted in the lens holes. However, in this case, foreign materials such as dust may enter the inside of the display apparatus through the lens holes, which may cause quality deterioration.

According to an embodiment of the disclosure, the fixing hole 210 may be formed in the reflective sheet 200 such that the coupling protrusion 30 is inserted in the fixing hole 210. Because the diameter of the fixing hole 210 is small compared to that of a typical lens hole and the size of the fixing hole 210 corresponds to the size of the coupling protrusion 30, a space between the coupling protrusion 30 and the fixing hole 210 may be extremely small. Accordingly, foreign materials such as dust may be substantially prevented from entering the gap between the coupling protrusion 30 and the fixing hole 210. Because foreign materials are prevented from entering the inside of the display apparatus 1, quality of the display apparatus 1 may be improved.

Referring to FIG. 8, after the reflective sheet 20 is rested on the rear chassis 15, the backlight unit 12 may be coupled to the rear chassis 15. When the backlight unit 12 is coupled to the rear chassis 15, the reflective sheet 20 may be prevented from being separated in the front direction from the rear chassis 15.

The light sources 110 may be mounted on the substrates 100. The substrates 100 may include a coupling hole 101. The coupling protrusion 30 may be inserted in the coupling hole 101, and the coupling protrusion 30 may slidingly move in the coupling hole 101.

Referring to FIGS. 8 and 9, the coupling protrusion 30 may be inserted in one side of the coupling hole 101, and then the corresponding substrate 100 may slide so that the coupling protrusion 30 moves to the other side of the coupling hole 101. When the coupling protrusion 30 is positioned at the one side of the coupling hole 101, the substrate 100 may be separated from the rear chassis 15. The reason is because the coupling protrusion 30 is able to pass through the one side of the coupling hole 101. When the coupling protrusion 30 slides to be positioned at the other side of the coupling hole 101, the substrate 100 may be fixed to the rear chassis 15 without being separated from the rear chassis 15. The reason is because the coupling protrusion 30 is unable to pass through the other side of the coupling hole 101.

Referring to FIGS. 8 and 9, the coupling hole 101 may include a first coupling area 102 and a second coupling area 103 having different widths. The first coupling area 102 and the second coupling area 103 may have different widths in a width direction of the substrate 100. The width direction may indicate the up-down direction in the drawings. The width of the second coupling area 103 may be smaller than that of the first coupling area 102 in the width direction of the substrate 100.

At least one portion of the first coupling area 102 may be curved.

The second coupling area 103 may be connected to the first coupling area 102 in the longitudinal direction of the substrate 100. The longitudinal direction of the substrate 100 may indicate the left-right direction in the drawings. The second coupling area 103 may be connected to the first coupling area 102 such that the coupling protrusion 30 is inserted in the coupling hole 101 to move between the first coupling area 102 and the second coupling area 103.

As described above, a length in up-down direction of the second coupling area 103 may be smaller than a length in up-down direction of the first coupling area 102. The width of the first coupling area 102 may be larger than the external diameter of the coupling protrusion 30 such that the coupling protrusion 30 is able to pass through the first coupling area 102. The width of the second coupling area 103 may be smaller than the external diameter of the coupling protrusion 30 such that the coupling protrusion 30 is unable to pass through the second coupling area 103.

The coupling protrusion 30 may pass through the fixing hole 210 of the reflective sheet 20 and then be inserted in the first coupling area 102 of the coupling hole 101. By sliding the coupling protrusion 30 inserted in the first coupling area 102 to the second coupling area 103, the substrate 100 may be fixed to the rear chassis 15. Generally, by sliding the substrate 100 in the left-right direction, the coupling protrusion 30 may slide from the first coupling area 102 to the second coupling area 103. When the coupling protrusion 30 slides from the first coupling area 102 to the second coupling area 103, the second coupling area 103 may be inserted in a coupling groove 31 (see FIG. 11) formed in the coupling protrusion 30 so that the substrate 100 may be fixed.

Figure 10:
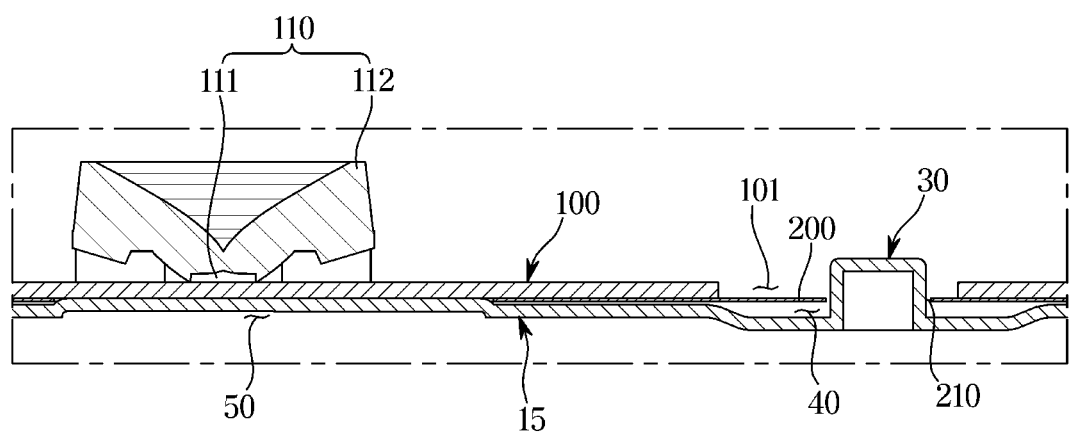
FIG. 10 is a cross-sectional view taken along line E-E' of FIG. 9.
Figure 11:
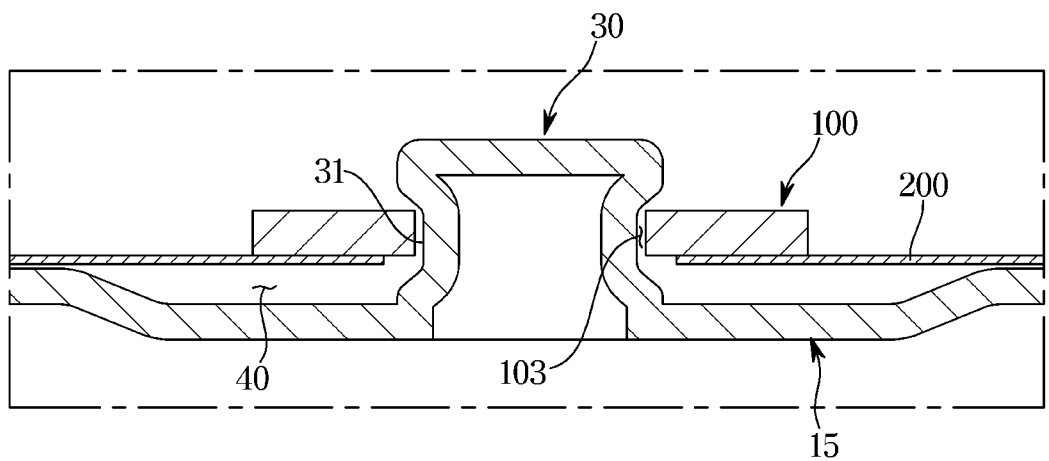
FIG. 11 is a cross-sectional view taken along line F-F' of FIG. 9.

FIG. 10 is a cross-sectional view taken along line E-E' of FIG. 9. FIG. 11 is a cross-sectional view taken along line F-F' of FIG. 9.

Referring to FIG. 10, each light source 110 may include a LED 111 mounted on the substrate 100 and a lens 112 covering the LED 111 to diffuse light.

Heat generated from the LED 111 may be transferred to the substrate 111, and to prevent inside temperature of the display apparatus 1 from rising to a reference temperature or higher, the heat transferred to the substrate 111 may need to be discharged to the outside. The rear chassis 15 may be made of a metal material, and the metal material is effective in heat dissipation due to its high heat-transfer efficiency.

According to an embodiment of the disclosure, a rear surface of the substrate 100 which is adjacent to the LED 111 as a heat-emitting device may contact the heat dissipation groove 50. Heat transferred from the LED 111 to the substrate 111 adjacent to the LED 111 may be transferred to the heat dissipation groove 50. The heat transferred to the heat dissipation groove 50 may be transferred to the remaining portion of the rear chassis 15, and through the process, heat generated from the LED 111 may be discharged to the outside. When no heat dissipation hole 220 is provided in the reflective sheet 200 and no heat dissipation groove 50 is provided in the rear chassis 15, it may be difficult to effectively discharge heat generated by the LED 111 from the substrate 100 to the outside. In this case, the inside temperature of the display apparatus 1 may rise to the reference temperature or higher so that safety may be not secured. Meanwhile, according to an embodiment of the disclosure, heat generated by the LED 111 may be effectively discharged to the outside through the heat dissipation groove 50 provided in the rear chassis 15 and the heat dissipation hole 220 provided in the reflective sheet 200. Accordingly, heat dissipation ability of the display apparatus 1 may be improved.

Referring to FIG. 11, the coupling protrusion 30 may include the coupling groove 31 formed in the side surface.

The coupling groove 31 may be depressed along at least one portion of a circumference of the coupling protrusion 30. The coupling groove 31 may be formed at one side surface and the other side surface of the coupling protrusion 30.

The coupling protrusion 30 may slide until the second coupling area 103 is inserted in and coupled to the coupling groove 31. When the second coupling area 103 is inserted in and coupled to the coupling groove 31, the substrate 100 may be fixed and coupled to the rear chassis 15. When the substrate 100 is fixed and coupled to the rear chassis 15, the reflective sheet 200 positioned between the substrate 100 and the rear chassis 15 may be fixed and coupled to the rear chassis 15.

As shown in FIG. 11, the fixing groove 210 (see FIG. 10) may have a diameter that is larger than the external diameter of the coupling protrusion 30. The width of the second coupling area 103 may be smaller than the external diameter of the coupling protrusion 30. The coupling groove 31 may be formed in the side surface of the coupling protrusion 30 corresponding to the second coupling area 103, and, when the second coupling area 103 is inserted in the coupling groove 31, the substrate 100 may be fixed and coupled to the rear chassis 15.

Figure 12:
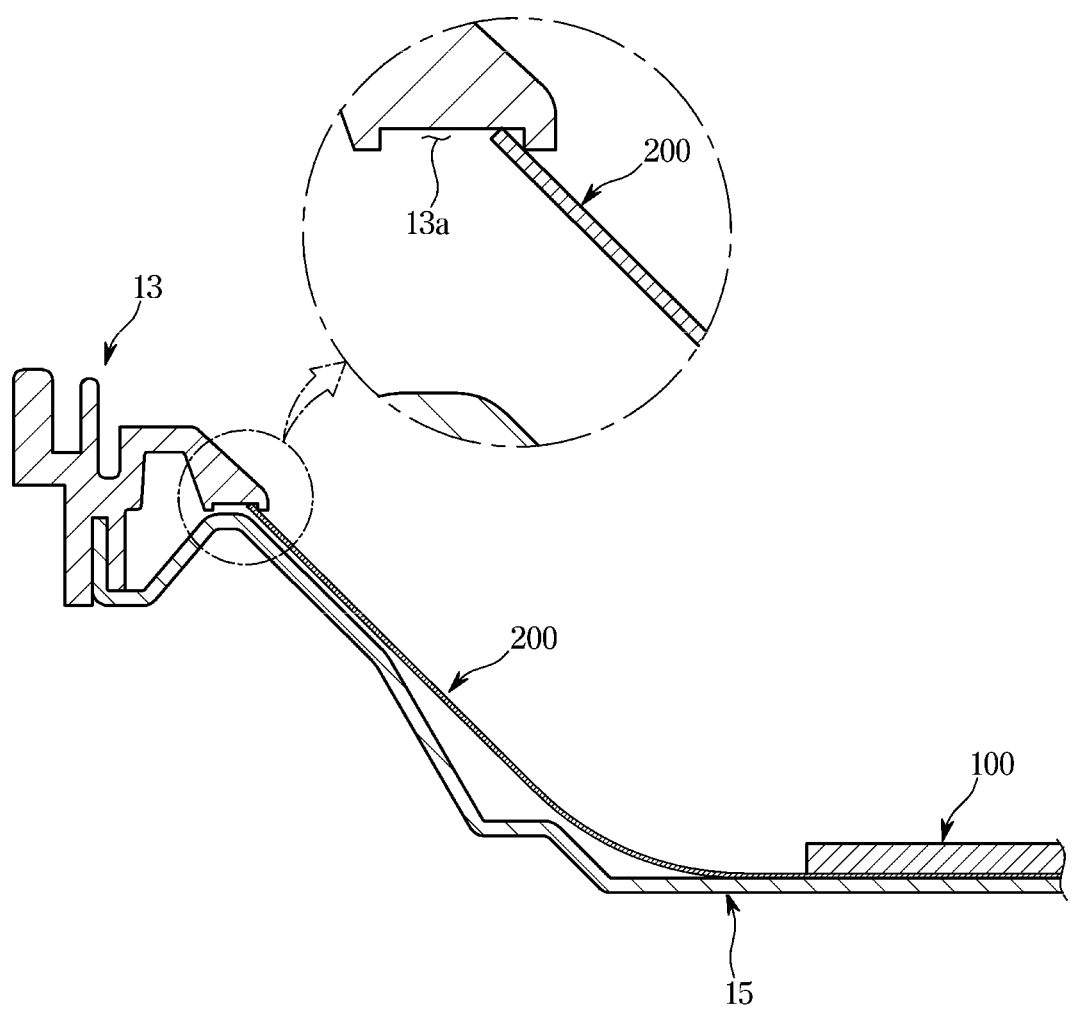
FIG. 12 shows a portion of a cross-sectional view taken along line D-D' of FIG. 7.

FIG. 12 shows a portion of a cross-sectional view taken along line D-D' of FIG. 7.

Referring to FIG. 12, the side frame 13 may be coupled to the rear chassis 15 to fix the edge portions of the reflective sheet 200.

The side frame 13 may include a sheet groove 13a on which the edge portions of the reflective sheet 20 are rested.

As described above, when the substrate 100 is fixed and coupled to the rear chassis 15, the reflective sheet 200 may be fixed and coupled to the rear chassis 15 together with the substrate 100. However, because the edge portions corresponding to borders of the reflective sheet 200 are not fixed, a lifting phenomenon may occur. The edge portions may indicate border regions of the reflective sheet 200.

Typically, a process of folding such edge portions has been performed, which is one of causes of an increase in manufacturing cost.

According to an embodiment of the disclosure, because the side frame 13 includes the sheet groove 13a, the edge portions of the reflective sheet 200 may be rested on the sheet groove 12a by coupling the side frame 12 to the rear chassis 15 without having to perform a separate folding process. When the edge portions of the reflective sheet 200 are rested on the sheet groove 13a, the edge portions of the reflective sheet 20 may be fixed without being lifted.

As shown in FIG. 12, when the substrate 100 is coupled to the rear chassis 15 after the reflective sheet 200 is rested on the rear chassis 15, the reflective sheet 200 may be smoothly bent at regions where the rear chassis 15 is bent. The edge portions corresponding to end portions of the bent reflective sheet 200 may be rested on the resting groove 13a when the side frame 13 is coupled to the rear chassis 15, so that a work of fixing the reflective sheet 200 may be completed.

Typically, when lenses mounted on substrates pass through lens holes provided in a reflective sheet, the reflective sheet has been lifted at the portions adjacent to the lens holes. To prevent the reflective sheet from being lifted, a roller process for positioning the reflective sheet adjacent to the lens holes between the lenses and the substrates has been performed.

According to an embodiment of the disclosure, the edge portions of the reflective sheet 200 may be smoothly rested on the resting groove 13a of the side frame 13 when the side frame 13 is coupled to the rear chassis 15, without having to perform either a folding process or a roller process. Accordingly, both the folding process and the roller process may not need to be performed, thereby improving the assembly and productivity of the display apparatus 1.

According to a concept of the disclosure, by removing lens holes required in a process of coupling the reflective sheet to the backlight unit, foreign materials such as dust may be prevented from entering the inside of the display apparatus through the lens holes.

According to a concept of the disclosure, because the substrates cover the holes penetrating the reflective sheet, foreign materials such as dust may be prevented from entering the inside of the display apparatus through the holes penetrating the reflective sheet.

According to a concept of the disclosure, there is provided a display apparatus with improved heat dissipation performance by increasing a contact area between the substrates and the rear chassis.

According to a concept of the disclosure, there is provided a display apparatus with an improved assembly structure of the substrates on which the light sources are mounted and the rear chassis to reduce noise that is generated when the substrates bump into the rear chassis.

According to a concept of the disclosure, there is provided a display apparatus with improved assembly and productivity by reducing processes required for fixing the reflective sheet to the rear chassis.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
   a display panel;
   a chassis configured to cover a surface of the display panel and including
      a coupling protrusion, and
      a heat dissipation groove protruding from an exterior surface of the chassis;
   a reflective sheet including a fixing hole and a heat dissipation hole;
   a substrate including a coupling hole; and
   a plurality of light sources mounted on the substrate to irradiate light toward the display panel,
   wherein the chassis, the reflective sheet, and the substrate are configured so that:
      the coupling protrusion is insertable through the fixing hole and the coupling hole and the heat dissipation groove is insertable into the heat dissipation hole to cause the chassis to cover the surface of the display panel with the coupling protrusion and the heat dissipation groove protruding toward the surface of the display panel, and the reflective sheet to rest on a surface of the chassis, and,
      with the reflective sheet resting on the surface of the chassis, the substrate is coupleable to the chassis by sliding the coupling protrusion in the coupling hole to cause a surface of the substrate to contact the heat dissipation groove.

2. The display apparatus according to claim 1, wherein the coupling hole includes:
   a first coupling area having a width that is larger than an external diameter of the coupling protrusion, such that the coupling protrusion is insertable in the first coupling area; and
   a second coupling area extending in a direction in which the substrate extends from the first coupling area, the second coupling area having a width that is smaller than the external diameter of the coupling protrusion.

3. The display apparatus according to claim 2, wherein, the coupling protrusion and the first coupling area are configured so that after the coupling protrusion is inserted in the first coupling area, the coupling protrusion is slidable to the second coupling area, so that the coupling protrusion is fixed in the second coupling area.

4. The display apparatus according to claim 3, wherein the coupling protrusion includes a coupling groove depressed along at least one portion of a circumference of the coupling protrusion so that that the coupling protrusion is configured to be slidable from the first coupling area to the second coupling area.

5. The display apparatus according to claim 1, wherein the heat dissipation hole is adjacent to the plurality of light sources.

6. The display apparatus according to claim 5, wherein the substrate is arranged so that the heat dissipation hole is positioned across from the substrate to prevent dust from entering through the heat dissipation hole when the coupling protrusion is slid in the coupling hole.

7. The display apparatus according to claim 1, wherein the heat dissipation grove is configured so that while the heat dissipation groove is inserted into the heat dissipation hole, the heat dissipation groove contacts an exterior surface of the substrate, thereby transferring heat generated from the substrate to the chassis.

8. The display apparatus according to claim 1, wherein a surface of the substrate is coated with a high reflection coating material to reduce a difference in reflectance between the reflective sheet and the surface of the substrate.

9. The display apparatus according to claim 1, wherein the chassis further includes a recessed portion that is recessed toward a rear direction of the chassis, and the coupling protrusion protrudes toward a front direction of the chassis from the recessed portion.

10. The display apparatus according to claim 1, further comprising a side frame coupled to the chassis along edges of the chassis, so that edges of the reflective sheet are insertable and fixable between the chassis and the side frame when the coupling protrusion is slid in the coupling hole.

11. The display apparatus according to claim 10, wherein the side frame incudes a resting groove on which the edges of the reflective sheet are rested when the coupling protrusion is slid in the coupling hole.

12. The display apparatus according to claim 1, wherein a diameter of the fixing hole corresponds to an external diameter of the coupling protrusion to prevent dust from entering through the fixing hole.

13. The display apparatus according to claim 1, wherein the substrate is coupled to the chassis so that the plurality of light sources face the display panel when the coupling protrusion is slid in the coupling hole.

14. A display apparatus comprising:
   a display panel;
   a substrate including a coupling hole;
   a plurality of light sources mounted on the substrate to irradiate light to the display panel;
   a chassis configured to cover a surface of the display panel and including
      a coupling protrusion, and
      a heat dissipation groove protruding from an exterior surface of the chassis;
   a reflective sheet including a fixing hole and a heat dissipation hole,
   wherein the chassis, the reflective sheet, and the substrate are configured so that:
      the coupling protrusion is insertable through fixing hole and the coupling hole and the heat dissipation groove is insertable into the heat dissipation hole to cause the chassis to cover the surface of the display panel with the heat dissipation groove protruding toward the surface of the display panel, and,
      with the coupling protrusion inserted through the fixing hole and into the coupling hole and the heat dissipation groove inserted into the heat dissipation hole, the substrate is couplable to the chassis by sliding the coupling protrusion in the coupling hole to cause a surface of the substrate to contact the heat dissipation groove.

15. The display apparatus according to claim 14, wherein the coupling hole includes:
   a first coupling area having a width that is larger than an external diameter of the coupling protrusion such that the coupling protrusion is inserted in the first coupling area; and
   a second coupling area extending in a direction in which the substrate extends from the first coupling area, the second coupling area having a width that is smaller than the external diameter of the coupling protrusion.

16. The display apparatus according to claim 14, wherein the heat dissipation hole that is adjacent to the plurality of light sources.

17. The display apparatus according to claim 14, wherein the heat dissipation groove is configured so that while the heat dissipation groove is inserted into the heat dissipation hole, the heat dissipation groove contacts the surface of the substrate, thereby transferring heat generated from the substrate to the chassis while the coupling protrusion is slid in the coupling hole.

18. A display apparatus comprising:
- a display panel;
- a substrate including a coupling hole;
- a plurality of light sources mounted on the substrate to irradiate light to the display panel;
- a reflective sheet including a fixing hole formed at a location corresponding to the coupling hole, and
- a heat dissipation hole; and
- a chassis including
  - a heat dissipation groove protruding from an exterior surface of the chassis, and
  - a coupling protrusion,
- wherein the chassis, the reflective sheet, and the substrate are configured so that the coupling protrusion is insertable through the fixing hole and the coupling hole and the heat dissipation groove is insertable into the heat dissipation hole and, with the coupling protrusion inserted into the fixing hole and the coupling hole and the heat dissipation groove inserted into the heat dissipation hole, the substrate is couplable to the chassis by sliding the coupling protrusion in the coupling hole to cause a surface of the substrate to contact the heat dissipation groove.

\* \* \* \* \*

UNITED STATES PATENT AND TRADEMARK OFFICE
CERTIFICATE OF CORRECTION

PATENT NO. : 11,340,650 B2
APPLICATION NO. : 16/875052
DATED : May 24, 2022
INVENTOR(S) : Sun-Jin Kim et al.

It is certified that error appears in the above-identified patent and that said Letters Patent is hereby corrected as shown below:

In the Claims

Column 13, Line 49:
In Claim 4, delete "that that" and insert --that--.

Signed and Sealed this
Twenty-sixth Day of July, 2022

Katherine Kelly Vidal
*Director of the United States Patent and Trademark Office*